United States Patent Office

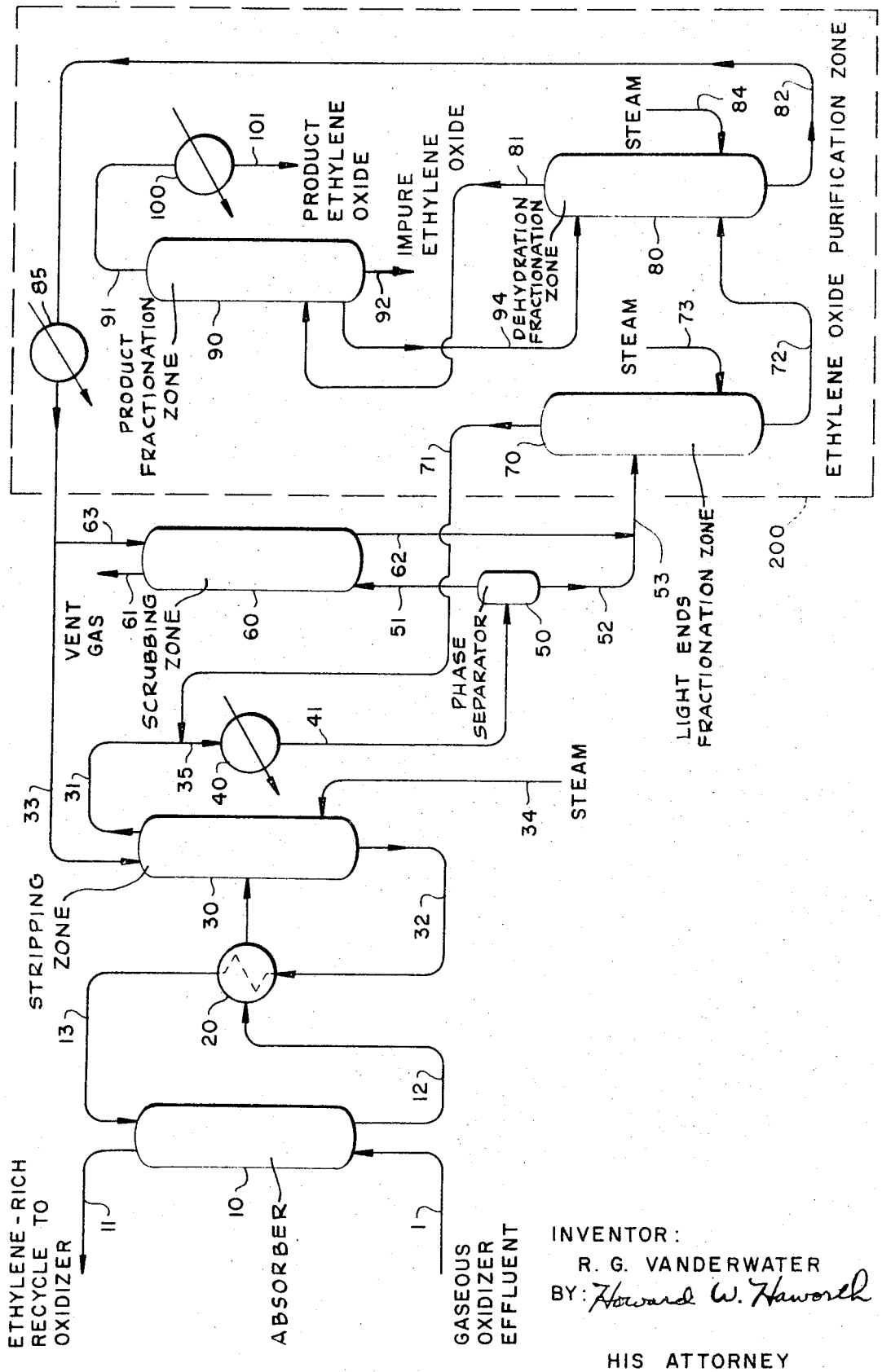

3,745,092
Patented July 10, 1973

3,745,092
RECOVERY AND PURIFICATION OF ETHYLENE OXIDE BY DISTILLATION AND ABSORPTION
Robert G. Vanderwater, El Cerrito, Calif., assignor to Shell Oil Company, New York, N.Y.
Filed Jan. 11, 1971, Ser. No. 105,205
Int. Cl. C07d 1/14
U.S. Cl. 203—42      4 Claims

ABSTRACT OF THE DISCLOSURE

Ethylene oxide, produced by the direct, catalytic oxidation of ethylene, in admixture with inert gases, low molecular weight hydrocarbons, and oxides of carbon, is absorbed in an aqueous stream and stripped therefrom to produce a gaseous stripping zone overhead. The stripping zone overhead is cooled, condensing most of the water and a portion of the ethylene oxide contained therein. The cooled stripping zone overhead is phase separated, the vapor being contacted with a lean aqueous absorbent in a scrubbing zone to recover substantially all of the ethylene oxide from the non-condensable gases. The liquid from the phase separator and the ethylene oxide-rich aqueous absorbate are joined and fed to an ethylene oxide purification zone, in which high purity ethylene oxide is recovered.

BACKGROUND OF THE INVENTION

This invention relates to the recovery of ethylene oxide from aqueous mixtures which contain carbon dioxide, low molecular weight hydrocarbons, and other inerts dissolved therein. More particularly, it deals with recovering ethylene oxide, prepared by the catalytic oxidation of ethylene, from dilute aqueous streams. Specifically, a processing sequence is disclosed which permits recovery of high purity ethylene oxide from dilute aqueous streams while minimizing yield losses to ethylene glycols by hydrolysis.

THE PRIOR ART

On an industrial scale, ethylene oxide is generally manufactured by the silver-catalyzed oxidation of ethylene. The effluent from the oxidation reactor will contain small quantities of ethylene oxide in admixture with large amounts of unconverted ethylene and oxygen, as well as appreciable quantities of carbon dioxide, low molecular weight hydrocarbons, and inert gases such as argon and nitrogen. The customary technique for recovering ethylene oxide from such mixtures is to, first, absorb the ethylene oxide in a lean aqueous absorbent, and then, process the fat absorbent in a variety of ways, including fractionation, scrubbing, and stripping, to recover the epoxide. Techniques previously employed for working up the dilute aqueous solution of ethylene oxide have generally involved costly and complicated equipment and processes.

One of the major problems encountered by processes of the prior art, but rarely referred to, is the hydrolysis of ethylene oxide to ethylene glycol, diethylene glycol, and higher glycols when the ethylene oxide is stripped from the absorbate in which it is initially dissolved. This hydrolysis occurs because of the hold-up of ethylene oxide and water on trays in the stripper at elevated temperatures. On one hand, the pressure maintained within the stripper should be above atmospheric; otherwise, air could be drawn into the system and thus create mixtures of ethylene oxide, hydrocarbons, and oxygen which are flammable. On the other hand, if the pressure at which the stripper operates is increased too much above atmospheric, or the concentration of ethylene oxide throughout the stripper is allowed to rise, the amount of ethylene oxide lost to glycols by hydrolysis is greatly increased. The hydrolysis products so produced are of a very complex and impure nature, and considerable equipment, expensive to install, operate, and maintain, must be employed to recover the glycols as high quality products.

One approach to this problem would be to operate the stripper at slightly above atmospheric pressure, and compress the uncondensed vapor overhead. Unfortunately, such compresson equipment is expensive, and necessitates high operating and maintenance costs. Another alternative would be to use refrigeration to condense the stripper overhead. This method, too, is expensive and is limited in applicability by the formation of a solid ethylene oxide-water hydrate at or below 52° F.

BRIEF SUMMARY OF THE INVENTION

It has now been found that in the separation of ethylene oxide from aqueous mixtures containing carbon dioxide, low molecular weight hydrocarbons and other inert materials, hydrolysis of ethylene oxide in the stripping zone may be minimized, and the overall yield of ethylene oxide increased, by separating the ethylene oxide in a stripping zone operated at a pressure of about 1 to about 20 p.s.i.g. and cooling the overhead product from the stripping zone to condense most of the water and a portion of the ethylene oxide contained therein; phase separating the cooled, stripping zone overhead at a pressure of about 0.5 to about 18 p.s.i.g. and a temperature of about 52° to about 90° F.; contacting the phase-separated vapor with a lean aqueous absorbent in a scrubbing zone to recover substantially all of the ethylene oxide contained therein; mixing the condensate from the phase separation with the fat absorbate from the scrubbing zone; and passing the combined condensate-fat absorbate stream to an ethylene oxide purification zone, from which high purity ethylene oxide is recovered.

BRIEF DESCRIPTION OF THE DRAWING

The accompanying drawing diagrammatically illustrates a preferred embodiment of the present invention. Shown therein are an absorber for recovering the ethylene oxide from the oxidation reactor effluent, a stripping zone, a scrubbing zone, a phase separator, an ethylene oxide purification zone, and their interconnections. Nonessential pieces of equipment, such as pumps, surge vessels, accumulators, and the like, have been omitted for purposes of clarity.

DETAILED DESCRIPTION OF THE INVENTION

The process of the present invention is particularly suitably applied to the effluent from an oxidation reactor in which ethylene and oxygen, under the influence of a silver catalyst, have combined to form ethylene oxide. The effluent from the oxidizer is generally at a pressure of about 150 to about 350 p.s.i.g., at a temperature of about 400° to about 550° F., and generally has a composition comprising about 0.5 to about 3% ethylene oxide, up to about 35% ethylene, as much as about 6% oxygen, 0.5 to about 15% carbon dioxide, and inerts, such as nitrogen and argon.

Such dilute ethylene oxide mixtures are cooled to a temperature of about 100° to about 200° F., and thereafter absorbed in an aqueous stream to separate the ethylene oxide from unreacted ethylene and oxygen, as well as other gaseous components of the oxidation reactor effluent. The unabsorbed, gaseous materials, rich in ethylene, are suitable for recycle to the catalytic oxidation reactor.

This initial aqueous absorbate, which contains ethylene oxide in dilute concentration, together with some dissolved carbon dioxide and gaseous inerts, passes to a stripping zone for separation overhead of a gaseous fraction comprising a predominance of ethylene oxide and water vapor, together with some carbon dioxide and gaseous inerts, from a liquid aqueous bottoms fraction. Preferably, the stripping zone operates at a pressure of from about 1 to about 20 p.s.i.g. The bottoms fraction from the stripping zone may be recycled after being cooled and employed to absorb ethylene oxide contained in additional gaseous oxidizer effluent. The overhead product from the stripping zone is cooled, so as to condense most of the water and a portion of the ethylene oxide contained therein. The cooled stripping zone overhead is phase separated, at a pressure of from about 0.5 to about 18 p.s.i.g. and the resulting vapor is contacted with a lean aqueous absorbent in a scrubbing zone so as to recover substantially all of the ethylene oxide contained therein. Noncondensable gases are removed from the scrubbing zone as a vent stream, which may be compressed and recycled to the oxidation reactor to avoid loss of the contained ethylene. The condensate from the phase separator and the fat absorbent from the scrubbing zone are joined and passed to a series of fractionation zones, from which a high-purity ethylene oxide stream, and an aqueous stream, suitable for use in the stripping and/or scrubbing zones, are recovered.

As opposed to conventional recovery techniques, the process of the present invention permits operation of the ethylene oxide stripper at a lower pressure, and hence at a lower temperature, than would be possible by means of condensation of the vapor overhead without the subsequent use of a scrubbing zone as described above. Use of such lower pressures and temperatures in the stripping zone of the present invention considerably reduces the loss of ethylene oxide by hydrolysis. Furthermore, phase separation of the cooled stripper overhead avoids one disadvantage of earlier processes, namely, that the warm fat absorbate from the scrubbing zone mixes with cool, ethylene oxide-rich liquid from the stripper, with the result that some ethylene oxide is re-evaporated and increases the load on the secondary scrubbing zone.

DETAILED DESCRIPTION OF THE DRAWING

A fuller understanding of the present invention may be obtained by reference to the accompanying drawing. Nonessential pieces of equipment, such as pumps, surge vessels, and the like, have been omitted for purposes of clarity.

Referring to the drawings, a gaseous oxidizer effluent, such as that produced by the catalytic oxidation of ethylene over a silver catalyst, is introduced into absorber 10 through line 1. An aqueous stream is introduced into absorber 10 through line 13. In absorber 10, ethylene oxide together with small amounts of carbon dioxide and gaseous inerts are absorbed in the aqueous phase. The unabsorbed gas, usually comprising nitrogen, oxygen, carbon dioxide, methane, ethane and unreacted ethylene, is removed from absorber 10 through line 11 and is suitable for recycle to the catalytic oxidation reactor. The bottom product from the absorber, an aqueous stream containing the absorbed ethylene oxide, passes through line 12 and heater 20 before entering stripping zone 30. In order to improve the heat economy of the recovery process, it is desirable to heat the absorber bottoms in heat exchanger 20 against the stripping zone bottoms flowing in line 32. Additional cooling of the aqueous stream in line 13, although not shown, is usually provided.

Stripping zone 30 is designed for a fractionation recovery of 99.0%+ of the entering ethylene oxide. To any losses of ethylene oxide during the course of the stripping operation must be added the loss of ethylene oxide by hydration to ethylene glycol, diethylene glycol and higher glycols. The overhead vapor from stripping zone 30, flowing in line 31, contains 20–40% m. ethylene oxide and small amounts of fixed gases and carbon dioxide picked up in absorber 10. Water comprises the remainder of the overhead. The pressure at which the stripping zone 30 operates, about 1 to about 20 p.s.i.g. at the column top, is set at the minimum practical value which will insure positive pressure throughout the system and permit substantially complete recovery of ethylene oxide in scrubbing zone 60. In order to avoid flammable hydrocarbon-oxygen mixtures within stripping zone 30 and downstream recovery zones, it is desirable to prevent the pressure therein from falling below 1 atmosphere. In this manner air will not be drawn into the apparatus. The hold-up of ethylene oxide and water on a tray at an elevated temperature results in the hydrolysis of part of the ethylene oxide to ethylene glycol, diethylene glycol and higher glycols. Unless the pressure within the stripping zone is kept relatively low, preferably in the range of about 1 to about 20 p.s.i.g., a considerable amount of ethylene oxide hydrolysis will take place. Heat for stripping in this zone may be supplied via line 34 by the use of conventional reboilers, open steam, or any combination thereof.

The overhead, gaseous product from stripping zone 30, flowing in line 31, is joined by the sum of all gaseous ethylene oxide-containing streams exiting ethylene oxide purification zone 200 flowing in line 71. The resultant stream, flowing in line 35 is cooled in heat exchanger 40, thereby condensing most of the water and some of the ethylene oxide. The two-phase, partially-condensed stripping zone overhead flows through line 41 into phase separator 50, which operates at a pressure of from about 0.5 to about 18 p.s.i.g. and a temperature of about 52° to about 90° F. The separated vapor, flowing in line 51, contains most of the carbon dioxide and other gases originally dissolved in absorber 10, as well as appreciable ethylene oxide. This vapor is fed to scrubbing zone 60, where it is contacted against a cooled, lean aqueous absorbent flowing in line 63. A vent gas of noncondensibles, comprising a mixture of ethylene, low molecular weight hydrocarbons, inerts, and carbon dioxide, leaves scrubber 60 through line 61. This vent stream may be compressed and recycled to the oxidation reactor to avoid loss of contained ethylene. The ethylene oxide-rich bottoms absorbent, flowing in line 62, mixes with the condensate from phase separator 50 which is flowing in line 52. The resultant mixture passes, via line 53, to ethylene oxide purification zone 200, wherein ethylene oxide, suitable for merchant sales or further chemical conversion, and an aqueous stream suitable for use in the stripping zone, the scrubbing zone, or both, are produced.

The use of phase separator 50 is preferred over a simpler scheme wherein it is omitted and wherein the two-phase mixture flowing in line 41 is fed directly to scrubbing zone 60. In the simpler scheme, the cooled liquid portion of mixture 41 would contact intimately the warmer absorbent from the scrubbing zone within the bottom sump of the zone. These two liquids would reach an equilibrium temperature and composition. However, the increase in temperature of the ethylene oxide-rich liquid from mixture 41 would result in re-evaporation of a portion of the ethylene oxide. Thus, to prevent an increase in ethylene oxide loss in vent gas 61 in the simpler scheme, more absorbent, flowing in line 63, would have to be added to scrubbing zone 60. In the preferred recovery scheme shown on the accompanying drawing, such re-evaporation is avoided by increasing somewhat the pressure of streams 52 and 62 by pumps, not shown, before the streams are combined in line 53.

A variety of distillation schemes for the work-up of the aqueous ethylene oxide stream flowing in line 53 may be employed. A preferred flow arrangement is also shown in the accompanying drawing.

The mixture of condensate from phase separator 50 and fat absorbate from scrubbing zone 60, flowing in line 53, is fed to light ends column 70. This mixture contains some of the carbon dioxide and other gases which are originally absorbed in absorber 10. Light ends fractionation zone 70 effects the separation overhead of trace quantities of volatiles, such as fixed gases, low molecular weight hydrocarbons, and carbon dioxide. The overhead vapor from this column, flowing in line 71, joins with the stripping zone overhead, flowing in line 31, and is passed through heat exchanger 40 to condense any ethylene oxide contained in the former. There is a recycle of inert materials in the recovery scheme via line 71: the carbon dioxide and other inerts are fed to scrubbing zone 60 and are eventually vented through line 61. Heat may be supplied to light ends fractionation zone 70 by the use of a reboiler, open steam flowing in line 73, or any suitable combination. A constant flow of vapor from the top of zone 70 is maintained to assure adequate light-ends rejection. The bottom product from light ends fractionation zone 70, flowing in line 72, contains approximately 8–20% w. ethylene oxide in water and is fed to dehydration fractionation zone 80.

TABLE I.—EQUIPMENT CONDITIONS

| Equipment Item | Pressure, p.s.i.g. | Temperatures, °F. Top | Temperatures, °F. Bottom |
|---|---|---|---|
| Absorber | 175 | 84 | 140 |
| Stripping zone | 7 | 210 | 235 |
| Light ends fractionation zone | 6 | 108 | 122 |
| Scrubbing zone | 3.6 | 77 | 104 |
| Dehydration fractionation zone | 40 | 118 | 286 |
| Product fractionation zone | 38 | 109 | 118 |
| Separator 50 | 4.3 | 72 | |

Compositions of various streams are shown in Table II, wherein "Fixed Gases" refer to nitrogen, argon, and oxygen.

The acetaldehyde-rich ethylene oxide stream leaving the bottom of product column 90, in line 92, may be stripped to remove the aldehyde, and thereafter mixed with the top product of dehydration column 80, flowing in line 81, to increase the recovery of high purity ethylene oxide across the process.

TABLE II.—MOLAR COMPOSITIONS (PERCENT) OF VARIOUS FLOW STREAMS

| Stream | 92 | 13 | 12 | 31 | 51 | 52 | 33, 63, and 82 | 61 | 53 | 71 | 72 | 81 | 91 |
|---|---|---|---|---|---|---|---|---|---|---|---|---|---|
| Component: | | | | | | | | | | | | | |
| Fixed gases | | | Trace | .2 | .7 | | | 4.7 | | | | | |
| $CH_4$ | | | Trace | .4 | 1.8 | | | 10.9 | | | | | |
| $C_2H_6$ | | | | | | | | | | | | | |
| $C_2H_4$ | | | Trace | 1.0 | 4.9 | Trace | | 29.8 | Trace | .2 | | | |
| HCHO | | | | Trace | | Trace | Trace | | Trace | | Trace | Trace | Trace |
| $CO_2$ | Trace | | Trace | 1.4 | 6.6 | Trace | | 40.1 | Trace | 1.1 | Trace | Trace | Trace |
| Ethylene oxide | 99.8 | | .8 | 29.0 | 83.9 | 16.7 | Trace | 10.8 | 6.3 | 92.2 | 5.8 | 99.8 | 100 |
| Acetaldehyde | .1 | | | Trace | .1 | Trace | Trace | Trace | Trace | .1 | Trace | .1 | Trace |
| Ethylene glycol | | 1.0 | 1.0 | | | | .1 | | .1 | | .1 | | |
| Diethylene glycol | | .1 | .1 | | | | Trace | | Trace | | Trace | | |
| Water | .1 | 98.9 | 98.0 | 68.0 | 2.0 | 83.3 | 99.9 | 3.7 | 93.6 | 6.4 | 94.1 | .1 | |

Etheylene oxide in the light ends fractionation zone bottoms is separated from water and recovered as an overhead vapor from dehydration fractionation zone 80. Dehydration fractionation zone bottoms, flowing in line 82, contains approximately 99% w. water. In common with some of the other distillation columns in the preferred recovery scheme, heat to dehydration fractionation zone 80 may be supplied by a reboiler, by open steam flowing in line 84, or their combination.

The vapor leaving the top of dehydration column 80 flows through line 81 to ethylene oxide product fractionation zone 90 for further rectification of ethylene oxide. The overhead product flowing in line 91, is condensed in heat exchanger 100 and leaves the process through line 101 as product ethylene oxide. A portion of the condensed overhead product ethylene oxide, not shown, is returned to product fractionation zone 90 as reflux. The bottom product from product fractionation zone 90, flowing in line 92 contains, as a dilute mixture in ethylene oxide, most of the acetaldehyde which enters the ethylene oxide purification zone. Optionally, ethylene oxide contained in this stream may be stripped from the acetaldehyde in a separate distillation column, not shown, so as to maximize the amount of high purity ethylene oxide produced. The ethylene oxide vapor from such an acetaldehyde column may be added to that flowing in line 81. A second bottom fraction, also withdrawn from product fractionation zone 90, is returned through line 94 to dehydration fractionation zone 80, where it is employed as reflux.

Excess dehydration zone bottoms cooled by heat exchanger 85, not required as lean absorbent for scrubbing zone 60, may be recycled via line 33 to an appropriate location in stripping zone 30.

Example

Ethylene oxide produced by the silver-catalyzed oxidation of ethylene is recovered via the process shown in the accompanying drawing. Approximate pressures and temperatures in the various items of equipment are indicated in Table I.

I claim as my invention:

1. A process for recovering ethylene oxide from a mixture comprising water, ethylene oxide, $C_1$ and $C_2$ hydrocarbons, oxides of carbon, acetaldehyde, and inerts which comprises
    (a) stripping by distillation, in a stripping zone at a pressure from about 1 to about 20 p.s.i.g., the aqueous ethylene oxide-containing mixture thereby producing a gaseous stripping zone overhead rich in ethylene oxide;
    (b) cooling the gaseous, stripping zone overhead, thereby producing a two-phase mixture:
    (c) phase separating at a pressure for about 0.5 to about 18 p.s.i.g. and a temperature from about 52 to about 90° F. the two phase mixture into a condensate stream and an uncondensed, stripping zone overhead stream;
    (d) contacting, in a scrubbing zone, the uncondensed, stripping zone overhead stream with cool lean aqueous absorbent, thereby producing an ethylene oxide-rich aqueous absorbate and a vent gas of non-condensable;
    (e) combining the condensate stream and the ethylene oxide-rich aqueous absorbate; and
    (f) fractionating by distillation the resulting combined stream in an ethylene oxide purification zone to recover ethylene oxide.

2. The process in accordance with claim 1 wherein the ethylene oxide purification zone comprises
    (a) a light ends fractionation zone, wherein materials in said combined stream more volatile than ethylene oxide are separated overhead;
    (b) a dehydration fractionation zone, wherein the bottoms from the light ends fractionation zone are separated into a top product comprising ethylene oxide and a bottom aqueous stream substantially free of ethylene oxide; and
    (c) an ethylene oxide product fractionation zone, wherein the dehydration fractionation zone top product is separated into a high purity ethylene oxide overhead product, and an acetaldehyde-containing ethylene oxide bottom product.

3. The process in accordance with claim 2 wherein the overhead from the light ends fractionation zone contains ethylene oxide, and said overhead joins the stripping zone overhead prior to said cooling and phase separation.

4. The process in accordance with claim 2 wherein at least a portion of the bottom aqueous stream from the dehydration fractionation zone, after cooling, constitutes at least a portion of the lean aqueous absorbent fed to the scrubbing zone.

References Cited

UNITED STATES PATENTS

| | | | |
|---|---|---|---|
| 3,165,539 | 1/1965 | Lutz | 203—42 |
| 2,533,675 | 12/1950 | Marschner | 203—42 |
| 3,418,338 | 12/1968 | Gilman et al. | 260—348.5 R |
| 3,174,262 | 3/1965 | Lutz | 55—50 |
| 3,350,417 | 10/1967 | Binning et al. | 203—87 |
| 2,549,290 | 4/1951 | Congdon et al. | 203—42 |
| 2,152,155 | 3/1939 | Rude | 203—87 |
| 2,377,736 | 6/1945 | White | 203—87 |

OTHER REFERENCES

Hydrocarbon Processing, November 1965, vol. 44, No. 11, pp. 211–213.

WILBUR L. BASCOMB, JR., Primary Examiner

U.S. Cl. X. R.

203—77; 260—348.5 R